(12) United States Patent
Liu et al.

(10) Patent No.: US 7,943,915 B2
(45) Date of Patent: May 17, 2011

(54) METHOD OF CALIBRATING A WAVELENGTH-MODULATION SPECTROSCOPY APPARATUS

(75) Inventors: Xiaoyong Liu, Malden, MA (US); Yufeng Huang, North Chelmsford, MA (US); John McKinley Poole, Maynard, MA (US); Gene Smith Berkowitz, Sudbury, MA (US); Anthony Kowal, Berlin, MA (US); Shawn D. Wehe, Niskayuna, NY (US); Hejie Li, Schenectady, NY (US)

(73) Assignee: GE Infrastructure Sensing, Inc., Billerica, MA (US)

( * ) Notice: Subject to any disclaimer, the term of this patent is extended or adjusted under 35 U.S.C. 154(b) by 344 days.

(21) Appl. No.: 12/249,096

(22) Filed: Oct. 10, 2008

(65) Prior Publication Data
US 2010/0089117 A1   Apr. 15, 2010

(51) Int. Cl.
*G01V 8/00* (2006.01)
*G01J 3/28* (2006.01)

(52) U.S. Cl. ..................... 250/559.1; 356/326

(58) Field of Classification Search ............ 250/226, 250/339.13, 339.1, 340, 345, 343, 301, 341.5, 250/208.2, 575, 573, 574, 559.1, 222.2, 559.4; 356/300–303, 306–309, 319–334, 451–456, 356/436–440; 73/31.03, 24.02
See application file for complete search history.

(56) References Cited

U.S. PATENT DOCUMENTS

| 3,893,771 | A | 7/1975 | Bell |
| 4,068,125 | A | 1/1978 | Bell |
| 4,953,390 | A | 9/1990 | Krempl et al. |
| 5,107,118 | A | 4/1992 | Murray, Jr. et al. |
| 5,134,276 | A | 7/1992 | Hobbs |
| 5,173,749 | A | 12/1992 | Tell et al. |
| 5,317,156 | A | 5/1994 | Cooper et al. |
| 5,448,071 | A | 9/1995 | McCaul et al. |

(Continued)

FOREIGN PATENT DOCUMENTS

EP          1544604 A1    6/2005

(Continued)

OTHER PUBLICATIONS

WO Search Report issued in connection with corresponding PCT Patent Application No. US09/57227 filed on Sep. 17, 2009.

(Continued)

*Primary Examiner* — Que T Le
*Assistant Examiner* — Jennifer Bennett
(74) *Attorney, Agent, or Firm* — Global Patent Operation; Mark A. Conklin (57) ABSTRACT

Several methods of calibrating a wavelength-modulation spectroscopy apparatus configured to measure a concentration of an analyte in a sample gas are disclosed. Each of the methods allows for calibration and recalibration using a relatively safe gas regardless of whether the sample gas for which the concentration of the analyte can be determined is a hazardous gas. In one embodiment of the invention, calibration that is sample-gas specific is accomplished by determining a first slope coefficient and calibration function for the sample gas, after which a scaling factor can be determined based on the first slope coefficient and a second slope coefficient for the same or a different sample gas and used in a subsequent calibration (or recalibration) to scale the calibration function. In other embodiments of the invention, calibration that is not sample-gas specific is accomplished to allow for the determination of the analyte concentration in variable gas compositions and constant gas compositions.

9 Claims, 4 Drawing Sheets

U.S. PATENT DOCUMENTS

| | | | |
|---|---|---|---|
| 5,491,341 A | 2/1996 | McCaul | |
| 5,528,040 A | 6/1996 | Lehmann | |
| 5,550,636 A | 8/1996 | Hagans et al. | |
| 5,572,031 A | 11/1996 | Cooper | |
| 5,625,189 A | 4/1997 | McCaul et al. | |
| 5,636,035 A | 6/1997 | Whittaker et al. | |
| 5,640,245 A | 6/1997 | Zybin et al. | |
| 5,742,054 A | 4/1998 | Atkinson | |
| 5,742,200 A | 4/1998 | He | |
| 5,742,399 A | 4/1998 | McAndrew et al. | |
| 5,813,767 A | 9/1998 | Calabro | |
| 5,818,578 A | 10/1998 | Inman et al. | |
| 5,835,230 A | 11/1998 | McAndrew et al. | |
| 5,838,008 A * | 11/1998 | Esler et al. | 250/339.08 |
| 5,847,392 A | 12/1998 | Van Den Berg et al. | |
| 5,880,850 A | 3/1999 | McAndrew et al. | |
| 5,949,537 A | 9/1999 | Inman et al. | |
| 5,963,336 A | 10/1999 | McAndrew et al. | |
| 5,969,825 A | 10/1999 | Bomse et al. | |
| 6,040,914 A | 3/2000 | Bortz et al. | |
| 6,044,329 A * | 3/2000 | Kidd | 702/28 |
| 6,064,488 A | 5/2000 | Brand et al. | |
| 6,084,668 A | 7/2000 | McAndrew et al. | |
| 6,150,661 A | 11/2000 | McCaul et al. | |
| 6,154,284 A | 11/2000 | McAndrew et al. | |
| 6,188,475 B1 | 2/2001 | Inman et al. | |
| 6,292,756 B1 | 9/2001 | Lievois et al. | |
| 6,341,521 B1 | 1/2002 | Bartolomey et al. | |
| 6,356,350 B1 | 3/2002 | Silver | |
| 6,420,695 B1 | 7/2002 | Grasdepot et al. | |
| 6,442,736 B1 | 8/2002 | Girard et al. | |
| 6,493,086 B1 | 12/2002 | McAndrew et al. | |
| 6,603,555 B1 | 8/2003 | Nanami et al. | |
| 6,611,335 B1 | 8/2003 | Hovde | |
| 6,639,678 B1 | 10/2003 | Veale | |
| 6,657,198 B1 | 12/2003 | May | |
| 6,741,348 B2 | 5/2004 | Larsen et al. | |
| 6,795,190 B1 | 9/2004 | Paul et al. | |
| 6,876,450 B2 | 4/2005 | Nanami et al. | |
| 7,009,170 B2 | 3/2006 | Dobbs et al. | |
| 7,075,362 B2 | 7/2006 | North | |
| 7,102,751 B2 | 9/2006 | Harper | |
| 7,132,661 B2 | 11/2006 | May | |
| 7,180,595 B2 | 2/2007 | Willing et al. | |
| 7,183,553 B1 | 2/2007 | Willing et al. | |
| 7,262,844 B2 | 8/2007 | Larsen et al. | |
| 7,339,168 B2 | 3/2008 | May | |
| 7,704,301 B2 * | 4/2010 | Zhou et al. | 95/90 |
| 2003/0218750 A1 | 11/2003 | Friberg | |
| 2005/0030540 A1 | 2/2005 | Thornton | |
| 2005/0286054 A1 | 12/2005 | Chen et al. | |
| 2006/0044562 A1 | 3/2006 | Hagene et al. | |
| 2006/0065834 A1 | 3/2006 | Flanders et al. | |
| 2006/0187976 A1 | 8/2006 | Mori et al. | |
| 2007/0229834 A1* | 10/2007 | Patel et al. | 356/432 |
| 2007/0246653 A1 | 10/2007 | Zhou | |
| 2007/0295908 A1 | 12/2007 | Wilkens et al. | |

FOREIGN PATENT DOCUMENTS

| | | |
|---|---|---|
| JP | 60117695 A | 6/1985 |

OTHER PUBLICATIONS

May R D: "Computer Processing of Tunable Diode Laser Spectra" Appl. Spectr., vol. 43, No. 5, May 1, 1989, pp. 834-839, XP002561502.

Zhou X et al: "Development of a fast temperature sensor for combustion gases using a single tunable diode laser" Applied Physics B: Laser and Optics, Springer International, Berlin, DE, vol. 81, Jan. 1, 2005, pp. 711-722, XP002474023.

Liu J T C et al.: "Large-Modulation-Depth 2f Spectroscopy with Diode Lasers for Rapid Temperature and Species Measuremens in Gases with Blended and Broadened Spectra" Appl. Opt., vol. 43, No. 35, Dec. 10, 2004, pp. 6500-6509, XP002561503.

PCT/US2009/057228, Search Report and Written Opinion, Sep. 17, 2009.

Zybin A V et al., "Dynamic range improvement and background correction in diode laser atomic absorption spectrometry" Spectrochimica Acta Part B; vol. 54, No. 3-4, Apr. 4, 1999, pp. 613-619, XP002560637, the whole document.

Hejie et al., "Extension of wave length-modulation spectroscopy to large modulation depth for diode laser absorption measurements in high-pressure gasses" Appl. Opt., vol. 45. No. 5, Feb. 10, 2006, pp. 1052-1061, XP002560638, the whole document.

Thomas L. Markey, Park Evaluations & Translations, 850 Seventh Ave. 5th Floor, New York. N.Y. 10019, pp. 1-19.

J. Reid and D. Labrie, Second-Harmonic Detection with Tunable Diode Lasers—Comparison of Experiment and Theory, Departments of Engineering Physics and Physics, McMaster University, Hamilton, Ontario, Canada L8S 4M1, pp. 203-210.

Joel A. Silver, Frequency-Modulation Spectroscopy For Trace Species Detection: Theory And Comparison Among Experimental Methods, Applied Optics, Feb. 20, 1992, vol. 31, No. 6, pp. 707-717.

Wiliam J. Kessler, Mark G. Allen, Steven J. Davis, Phillip A. Mulhall and Jan A. Polex, Near-IR Diode Laser-Based Sensor For PPB-Level Water Vapor in Industrial Gases, Physical Sciences Inc., 20 New England Business Center, Andover, MA 01810, 1998 Photonics, East, SPIE International, SPIE Paper No. 3537-A30 pp. 1-12.

Mark E. Paige, Commercial Gas Sensing With Vertical Cavity Lasers, Southwest Sciences, Inc., 1570 Pacheco St. Suite E-11, Santa Fe NM 87505, pp. 141-143.

A.R. W. McKellar, The Spectrum of Gaseous Methane at 77 K in the 1.1-2.6 µregion: a benchmark for planetary astronomy[1], *Herzberg Institute of Astrophysics, National Research Council of Canada*, Ottawa, Ont.. Canada K1A 0R6. Received May 10, 1989, pp. 1027-1035.

K. Strong, F. W. Taylor, S. B. Calcutt, J. J. Remedios and J. Ballards, Spectral Parameters of Self-And Hydrogen-Broadened Methane From 2000 to 9500 $cm^{-1}$ For Remote Sounding Of The Atmosphere Of Jupiter, Clarendon Laboratory, University of Oxford, Parks Road, Oxford and §S.E.R.C. Rutherford Appleton Laboratory, Chilton, Didcot, Oxfordshire, U.K., pp. 363-429.

Shih-Yi Chang and Tai-Ly Tso, Measurement of the Taiwan Ambient Trace Gas Concentration by Kilometer-Pathlength Fourier-Transform Infrared Spectroscopy, Analytical Science Feb. 1994, vol. 10, Department of Chemistry, National Tsing Hua University, Hsinchu, 30043, Taiwan, R.O.C., pp. 193-201.

Randy D. May, Computer Processing Of Tunable Diode Laser Spectra, Jet Propulsion Laboratory, California Institute of Technology, 4800 Oak Grove Drive, Pasadena, California 91109, vol. 43, No. 5, 1989, pp. 834-839.

Randy D. May and Christopher R. Webster, Data Processing And Calibration For Tunable Diode Laser Harmonic Absorption Spectrometers, Jet Propulsion Laboratory, California Institute of Technology, 4800 Oak Grove Drive, Pasadena, California 91109, vol. 49, No. 4, 1993, pp. 335-347.

Randy D. May, Open-Path, Near-Infrared Tunable Diode Laser Spectrometer For Atmospheric Measurements of $H_2O$, Jet Propulsion Laboratory, California Institute of Technology, 4800 Oak Grove Drive, Pasadena, California 91109, May 1998, pp. 1-25.

David C. Scott, Robert L. Herman, Christopher R. Webster, Randy D. May, Gregory J. Flesch, and Elisabeth J. Moyer, Airborne Laser Infrared Absorption Spectrometer (ALIAS-II) for In Situ Atmospheric Measurements of $N_2O$, $CH_4$, CO, HCl, and $NO_2$ From Balloon Or Remotely Piloted Aircraft Platforms, Applied Optics, vol. 38, No. 21, Jul. 20, 1999, pp. 4609-4622.

Randy D. May, Next-Generation Diode Laser Gas Sensors For Environmental And Industrial Monitoring, Spectra Sensors, Inc., 2400 Lincoln Avenue, Altadena, CA 91001, SPIE—Part of SPIE Conference On Advanced Materials and Optical Systems For Chemical and Biological Detection, Boston MA 1999, vol. 3858, pp. 110-118.

L.S. Rothman et al. The *Hitran* 2004 Molecular Spectroscopic Database, Journal of Quantitative Spectroscopy & Radiative Transfer 96 (2005), pp. 139-204.

* cited by examiner

| | -20°C | -10°C | 0°C | 10°C | 20°C | 30°C | 40°C | 50°C | 60°C |
|---|---|---|---|---|---|---|---|---|---|
| 10 psi | 0.000229 | 0.000239 | 0.000250 | 0.000261 | 0.000273 | 0.000285 | 0.000297 | 0.000310 | 0.000323 |
| 11 psi | 0.000240 | 0.000250 | 0.000261 | 0.000271 | 0.000283 | 0.000294 | 0.000306 | 0.000318 | 0.000331 |
| 12 psi | 0.000254 | 0.000264 | 0.000274 | 0.000284 | 0.000295 | 0.000306 | 0.000318 | 0.000330 | 0.000342 |
| 13 psi | 0.000269 | 0.000279 | 0.000288 | 0.000299 | 0.000309 | 0.000320 | 0.000331 | 0.000343 | 0.000355 |
| 14 psi | 0.000286 | 0.000295 | 0.000305 | 0.000315 | 0.000325 | 0.000336 | 0.000347 | 0.000358 | 0.000370 |
| 15 psi | 0.000305 | 0.000314 | 0.000323 | 0.000333 | 0.000343 | 0.000353 | 0.000364 | 0.000375 | 0.000387 |
| 16 psi | 0.000325 | 0.000334 | 0.000343 | 0.000352 | 0.000362 | 0.000373 | 0.000383 | 0.000394 | 0.000406 |
| 17 psi | 0.000346 | 0.000355 | 0.000364 | 0.000373 | 0.000383 | 0.000393 | 0.000404 | 0.000415 | 0.000426 |
| 18 psi | 0.000369 | 0.000378 | 0.000387 | 0.000396 | 0.000406 | 0.000416 | 0.000426 | 0.000437 | 0.000448 |
| 19 psi | 0.000394 | 0.000402 | 0.000411 | 0.000420 | 0.000430 | 0.000440 | 0.000450 | 0.000460 | 0.000471 |
| 20 psi | 0.000420 | 0.000428 | 0.000437 | 0.000446 | 0.000455 | 0.000465 | 0.000475 | 0.000485 | 0.000496 |
| 21 psi | 0.000447 | 0.000455 | 0.000464 | 0.000473 | 0.000482 | 0.000492 | 0.000502 | 0.000512 | 0.000523 |
| 22 psi | 0.000476 | 0.000484 | 0.000492 | 0.000501 | 0.000510 | 0.000520 | 0.000530 | 0.000540 | 0.000551 |
| 23 psi | 0.000506 | 0.000514 | 0.000522 | 0.000531 | 0.000540 | 0.000549 | 0.000559 | 0.000569 | 0.000580 |
| 24 psi | 0.000538 | 0.000545 | 0.000554 | 0.000562 | 0.000571 | 0.000580 | 0.000590 | 0.000600 | 0.000611 |
| 25 psi | 0.000571 | 0.000578 | 0.000586 | 0.000595 | 0.000604 | 0.000613 | 0.000622 | 0.000632 | 0.000643 |

METHOD OF CALIBRATING A WAVELENGTH-MODULATION SPECTROSCOPY APPARATUS

BACKGROUND OF THE INVENTION

The invention relates generally to spectroscopy methods and apparatuses, and more particularly to a method of calibrating a wavelength-modulation spectroscopy apparatus.

The majority of wavelength-modulation spectroscopy gas analyzers employ a technique called 2f, where laser wavelength is modulated at 1f but the resulting signal demodulated at the second harmonic, designated as 2f, to produce the second harmonic spectrum of the analyte. The magnitude of the harmonic spectrum (e.g., the peak height) is then used to determine the analyte concentration in the sample gas, such as, but not limited to, the concentration of moisture (water vapor) in natural gas. This determination of analyte concentration is made based on a defined relationship between the analyte concentration and the magnitude of the harmonic spectrum, and often relies on the peak height of second harmonic spectrum. However, the 2f peak height is affected not only by analyte concentration, but also by the pressure, temperature, and composition of the sample gas. As a result, calibration of these analyzers is sample gas-specific (i.e., an analyzer calibrated to measure the concentration of an analyte in sample gas A (e.g., natural gas) cannot accurately measure the concentration of the same analyte in sample gas B (e.g., nitrogen or air)). Furthermore, an analyzer designed to determine the concentration of an analyte in a particular sample gas that is hazardous (e.g., toxic, flammable, explosive, etc.) can only be calibrated during manufacturing and re-calibrated using the same hazardous gas.

Therefore, a need exists for a method of calibrating a wavelength-modulation spectroscopy apparatus that would allow for calibration with a relatively safe gas while providing the ability to measure analyte concentration in various sample gases.

BRIEF DESCRIPTION OF THE INVENTION

Several methods of calibrating a wavelength-modulation spectroscopy apparatus configured to measure a concentration of an analyte in a sample gas are disclosed. Each of the methods allows for calibration and recalibration using a relatively safe gas regardless of whether the sample gas for which the concentration of the analyte can be determined is a hazardous gas. In one embodiment of the invention, calibration that is sample-gas specific is accomplished by determining a first slope coefficient and calibration function for the sample gas, after which a scaling factor can be determined based on the first slope coefficient and a second slope coefficient for the same or a different sample gas and used in a subsequent calibration (or recalibration) to scale the calibration function. In other embodiments of the invention, calibration that is not sample-gas specific is accomplished to allow for the determination of the analyte concentration in variable gas compositions and constant gas compositions.

BRIEF DESCRIPTION OF THE DRAWINGS

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
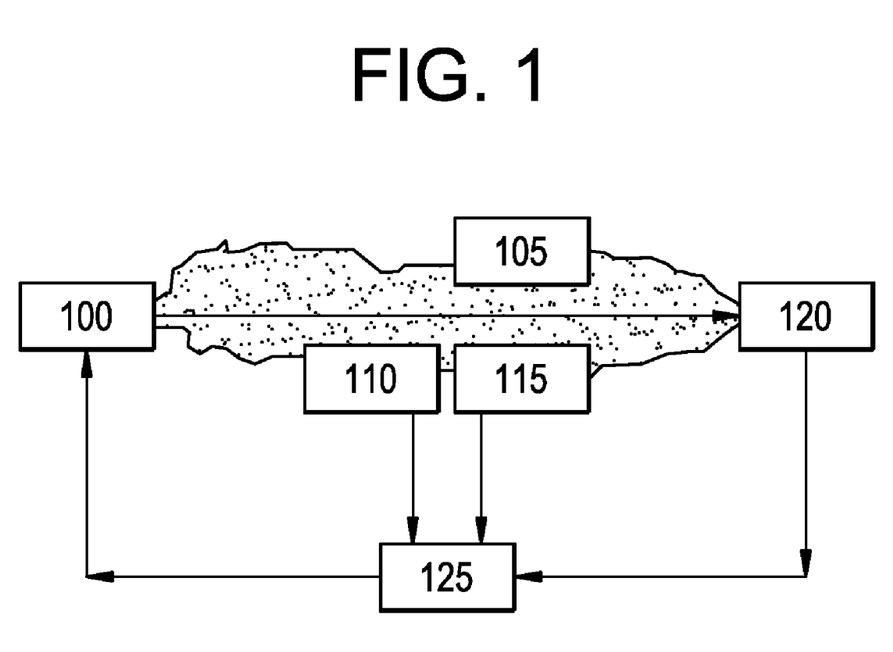
FIG. 1 illustrates a high-level component diagram of an exemplary wavelength-modulation spectroscopy apparatus.

In one embodiment of the invention, there is provided a method of calibrating a wavelength modulation spectroscopy apparatus. A high-level component diagram of an exemplary wavelength-modulation spectroscopy apparatus to be calibrated is illustrated in FIG. 1. A skilled artisan would appreciate the fact that the calibration methods of the invention are not limited to a particular spectroscopy apparatus, and can be practiced with wide range of wavelength modulation spectroscopy apparatuses.

A wavelength-modulation spectroscopy apparatus can include a monochromatic radiation 100 passing through a sample gas 105, a detector 120 that detects the intensity of the radiation 100 transmitted through the sample gas 105, a pressure sensor 110 and a temperature sensor 115 monitoring the sample gas pressure and temperature, respectively, and electronic circuitry 125 which can be employed to wavelength-modulate the radiation 100 at a modulation frequency, preamplify, acquire and demodulate by phase-sensitive detection the signal from the detector 120, at a harmonic of the modulation frequency, to produce a harmonic spectrum; and determine analyte concentration based on the measured spectrum, pressure and temperature of the sample gas 105. A skilled artisan would appreciate the fact that the configuration of a wavelength-modulation spectroscopy apparatus can vary from the configuration described herein, depending on technical requirements and design.

Generally, a wavelength-modulation spectroscopy apparatus, which can be configured to measure an analyte concentration in a sample gas, requires calibration. Assuming that a wavelength-modulation spectroscopy apparatus detects the $n^{th}$ harmonic spectrum of the analyte, the relation of the analyte concentration X, expressed as the mole fraction of the analyte in the sample, to the $n^{th}$ harmonic spectral signal magnitude $H_n(\bar{v},\alpha)$ can be generally described by the following equation:

$$X = \frac{\pi}{P \cdot L \cdot S(T) \cdot \int_{-\pi}^{\pi} \Phi(\bar{v}(t) + a\cos(\omega t))\cos(n\omega t) \, d(\omega t)} \cdot H_n(\bar{v}, a) + b \quad (1)$$

The relation of the analyte concentration X to the amplitude of the $n^{th}$ harmonic spectrum, $H_{n,m}(v_0,\alpha)$, which is defined as the maximum of the harmonic spectral signal magnitude, can be described by the following equation:

$$X = \frac{\pi}{P \cdot L \cdot S(T) \cdot \int_{-\pi}^{\pi} \Phi(v_0 + a\cos(\omega t))\cos(n\omega t) \, d(\omega t)} \cdot H_{n,m}(v_0, a) + b \quad (2)$$

$$= C(P, T, \gamma) \cdot H_{n,m}(v_0, a) + b$$

wherein the calibration slope function $C(P,T,\gamma)$ can be defined $$C(P, T, \gamma) = \frac{\pi}{P \cdot L \cdot S(T) \cdot \int_{-\pi}^{\pi} \Phi(v_0 + a\cos(\omega t))\cos(n\omega t)\, d(\omega t)} \quad (3)$$

P is the total pressure of the sample gas;
L is the absorption path length;
S(T) is the spectral line intensity;
$\Phi(v)$ is the spectral line profile function;
$\bar{v}(t)$ is the center frequency of a monochromatic radiation;
$v_0$ is the spectral line transition frequency [cm$^{-1}$];
$\alpha$ is the wavelength modulation amplitude;
$\omega$ is the angular frequency relating to the modulation frequency (f) as $\omega=2\pi f$; and
b is an intercept coefficient that corresponds to the contribution from noise floor of harmonic spectrum. Due to the noise floor, even if the analyte concentration X equals zero, the spectral amplitude $H_{n,m}(v_0,\alpha)$ can not normally reach zero, thus requiring a non-zero intercept coefficient b.

The spectral line intensity S(T) [cm$^{-2}$/psi] is temperature-dependent and can be defined by the following equation:

$$S(T) = S(T_{ref}) \frac{Q(T_{ref})}{Q(T)} \frac{\exp(-c_2 E_\eta / T)}{\exp(-c_2 E_\eta / T_{ref})} \frac{1 - \exp(-c_2 v_0 / T)}{1 - \exp(-c_2 v_0 / T_{ref})} \frac{T_{ref}}{T} \quad (4)$$

wherein
Q(T) is the total internal partition sum;
$c_2$=1.4387752 cm K is the second radiation constant; and
$E_\eta$ is the lower state energy [cm$^{-1}$].

Employing the Voigt line profile function for describing the spectral line profile, $$\Phi(v) = \Phi_V(v) = \frac{2}{\Delta v_D} \sqrt{\frac{\ln 2}{\pi}} \frac{r}{\pi} \int_{-\infty}^{+\infty} \frac{e^{-y^2}}{r^2 + (w-y)^2}\, dy \quad (5)$$

wherein the auxiliary variables r, w, and y are defined as follows:

$$r = \frac{\sqrt{\ln 2}\, \Delta v_C}{\Delta v_D} \quad (6)$$

$$w = \frac{2\sqrt{\ln 2}\, (v - v_0)}{\Delta v_D} \quad (7)$$

$$y = \frac{2\sqrt{\ln 2}\, v}{\Delta v_D} \quad (8)$$

The Doppler linewidth (FWHM) can be defined as follows:

$$\Delta v_D = 7.1623 \times 10^{-7} v_0 \sqrt{\frac{T}{M}} \quad (9)$$

The pressure-broadened linewidth (FWHM) can be defined as follows:

$$\Delta v_C = \gamma \cdot P \quad (10)$$

The effective pressure-broadening coefficient (FWHM) $\gamma$, which can be both gas-specific and temperature-dependent, can be defined as follows:

$$\gamma = \sum_j X_j \gamma_j \quad (11)$$

$$\gamma(T) = \gamma(T_{ref})(T_{ref}/T)^\varepsilon \quad (12)$$

In equation (11), $X_j$ and $\gamma_j$ are the mole fraction of the $j^{th}$ component of the sample and the pressure-broadening coefficient (FWHM) due to perturbation by the $j^{th}$ component, respectively.

Equations (5)-(10), describing the spectral line profile $\Phi(v)$, indicate that a variation in sample gas pressure (P), temperature (T), and composition can lead to a change in spectral line profile $\Phi(v)$.

Figure 2:
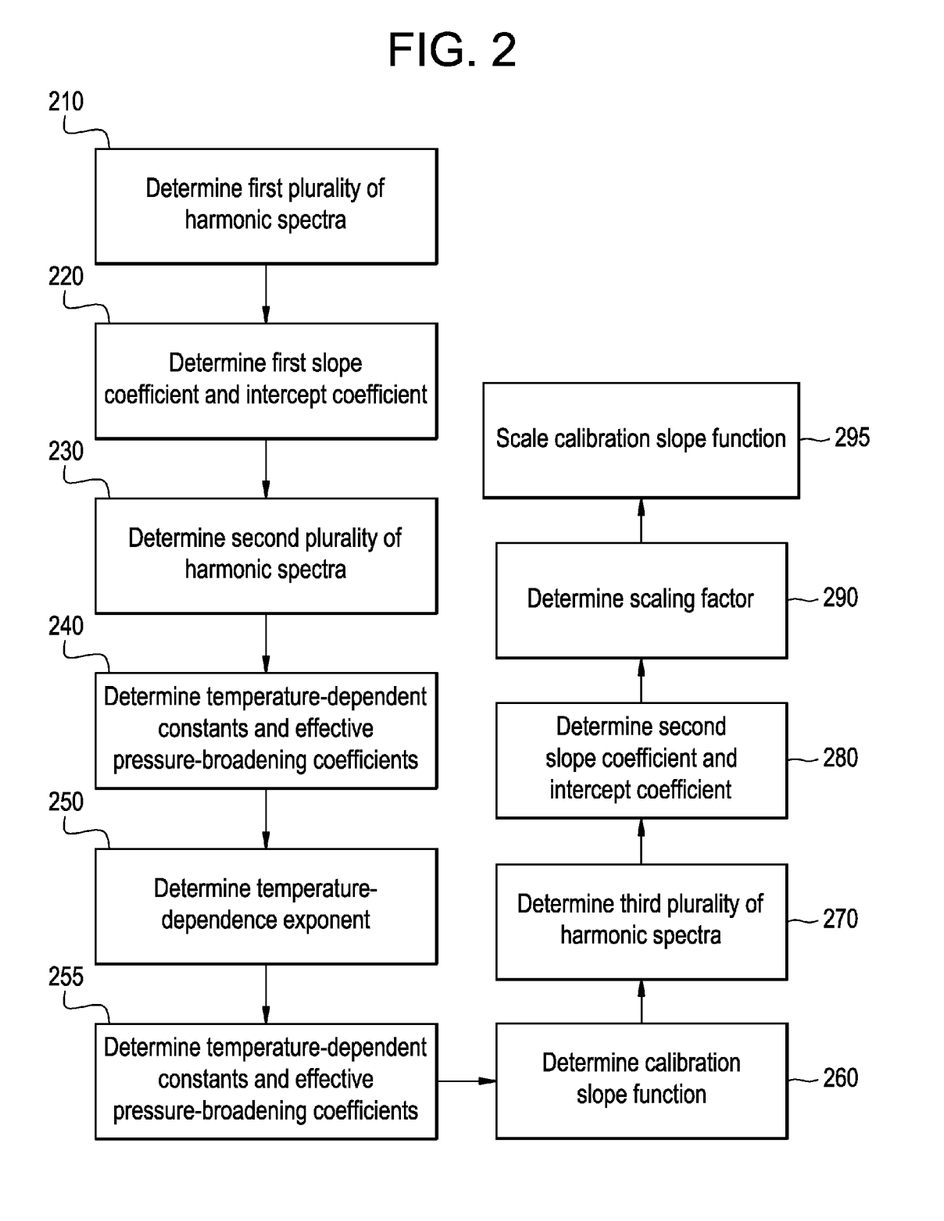
FIG. 2 illustrates a flowchart of one embodiment of the method of calibrating a wavelength-modulation spectroscopy apparatus.

In one embodiment of the invention described with reference to flowchart illustrated in FIG. 2, to calibrate a wavelength-modulation spectroscopy apparatus, a plurality of values of the calibration slope function defined by the equation (3) can be determined, for each sample gas, and for a plurality of sample gas pressure values and a plurality of sample gas temperature values. These calibration slope function values can be conveniently represented in a matrix form for each sample gas. The calibration process can be performed at the development stage, manufacturing stage or during the lifetime of a spectroscopy apparatus.

At step 210, a first plurality of harmonic spectra (H) of known analyte concentrations (X) in a sample gas can be determined at a reference pressure $P_{ref}$ and a reference temperature $T_{ref}$. The sample gas can be a relatively safe gas or hazardous gas.

At step 220, a slope coefficient $C(P_{ref}, T_{ref}, \gamma)$ for the sample gas corresponding to the reference pressure $P_{ref}$ and reference temperature $T_{ref}$, and the intercept coefficient b can be determined based on the first plurality of harmonic spectra (H) of known analyte concentrations (X) determined at step 210, e.g., by a linear fit of the data to equation (2). A skilled artisan would appreciate the fact that other methods of determining the slope coefficient and the intercept coefficient value based on the determined spectra are within the scope and the spirit of the invention. At this stage, the effective pressure-broadening coefficient ($\gamma$) can be left undetermined.

At step 230, a second plurality of harmonic spectra (H) of one or more known analyte concentrations (X) in the sample gas can be determined at various gas temperatures (T).

At step 240, a plurality of values of a temperature-dependent constant $$\frac{\pi}{L \cdot S(T)},$$

and a plurality of values of an effective pressure-broadening coefficient $\gamma$ of the sample gas, corresponding to the various gas temperatures (T) can be determined based on the second plurality of harmonic spectra (H) determined in step 230 and the intercept coefficient b determined in step 210, using the following procedure.

Doppler linewidth $\Delta v_D$ at the various temperatures can be calculated according to the equation (9). The spectral line profile function $\Phi(v)$ can be assumed to be defined by the Voigt line profile defined by the equation (5). The values of $$\frac{\pi}{L \cdot S(T)}$$

and γ can be varied to fit each measured spectrum to equation (1) until the difference between simulated and actual results is minimized, thus yielding the true values of $$\frac{\pi}{L \cdot S(T)}$$

and γ. In one embodiment, a standard non-linear least square fitting routine can be used for this purpose. The fitting procedure can be repeated to determine $$\frac{\pi}{L \cdot S(T)}$$

and γ values at the various temperatures. A skilled artisan would appreciate the fact that other methods of determining these values based on the measured spectra are within the scope and the spirit of the invention.

As is evident from its formula, the temperature-dependent constant $$\frac{\pi}{L \cdot S(T)}$$

has at least one temperature-dependent variable (e.g., S(T)), while other variables or constants are not necessarily temperature-dependent (e.g., π is not temperature-dependent, and L is not necessarily temperature-dependent).

At step 250, the temperature-dependence exponent ε for calculating the pressure-broadening coefficient for a given temperature is determined, by fitting γ and T values to equation (12).

At step 255, the temperature-dependent constant $$\frac{\pi}{L \cdot S(T)}$$

and the effective pressure-broadening coefficient γ are determined for various temperatures within a specified range at a specified step size, according to equations (4) and (12), respectively.

Figure 4:
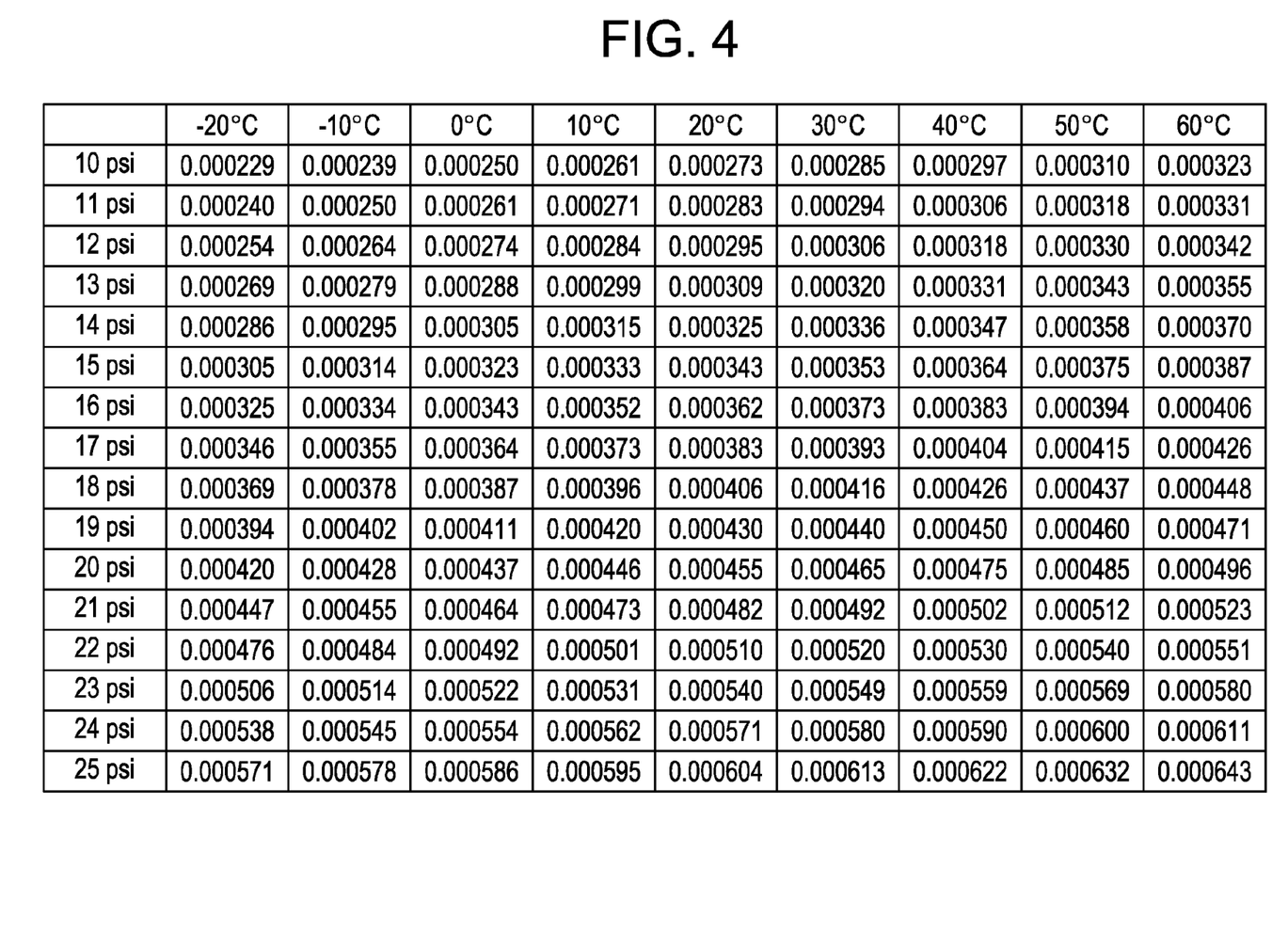
FIG. 4 illustrates an example abridged calibration matrix for 2f wavelength-modulation spectroscopy of moisture in air computed in one embodiment of the invention.

At step 260, the calibration slope function C(P,T,γ) for the sample gas at a plurality of gas temperature values and pressure values can be determined according to equation (3). The calibration slope function values can be conveniently stored in a matrix form. FIG. 4 illustrates an abridged calibration matrix for 2f wavelength-modulation spectroscopy of moisture in air.

Steps 210-260 can be performed for each of the sample gases that might be involved in the manufacture and use of a wavelength-modulation spectroscopy apparatus. They constitute the engineering calibration, which can be performed at the development stage of the spectroscopy apparatus. At the manufacturing stage or during the apparatus lifetime, a spectroscopy apparatus can be recalibrated to account for variations of the spectroscopy apparatus being recalibrated from the apparatus used for the engineering calibration. The recalibration procedure can be performed using a relatively safe sample gas.

At step 270, a plurality of harmonic spectra (H) of known analyte concentrations (X) in a sample gas of choice (e.g., a relatively safe gas) can be determined at a reference pressure $P_{ref}$ and a reference temperature $T_{ref}$.

At step 280, a slope coefficient $C(P_{ref}, T_{ref}, \gamma)$ for the sample gas corresponding to the reference pressure $P_{ref}$ and reference temperature $T_{ref}$ and the intercept coefficient b can be determined based on the plurality of harmonic spectra (H) of known analyte concentrations (X) measured at step 270, e.g., by a linear fit of the data to equation (2). A skilled artisan would appreciate the fact that other methods of determining the slope coefficient and the intercept coefficient value based on the determined spectra are within the scope and the spirit of the invention.

At step 290, a scaling factor can be determined as the ratio of the slope coefficient value determined at step 280 and the slope coefficient value determined during the engineering calibration at step 220 for the same sample gas.

At step 295, each of the calibration slope function values determined during the engineering calibration at step 260 can be multiplied by the scaling factor determined at step 290 to produce an adjusted calibration matrix comprising a plurality of adjusted calibration function values. This adjusted calibration matrix and the intercept coefficient b determined at step 280 enable the determination of analyte concentration in a sample gas based on the measurement of a harmonic spectrum, according to equation (2).

A wavelength-modulation spectroscopy apparatus calibrated in this manner is versatile and able to accurately measure analyte concentration in different background gases within a specified range of sample gas pressure and temperature. In addition, it allows the use of a relatively safe gas for manufacture calibration, verification of calibration, and recalibration, thus facilitating the regulatory compliance. Since both the calibration matrix and intercept coefficient are pre-determined, it does not require substantial microprocessor capabilities for digital signal processing and analyte concentration determination. Therefore, the calibration method according to the invention provides a viable, cost-effective solution to the calibration challenge associated with a wavelength-modulation spectroscopy apparatus.

In another embodiment of the invention, described with reference to FIG. 3, the values of the temperature-dependent constant $$\frac{\pi}{L \cdot S(T)}$$

and the intercept coefficient b are pre-determined with a sample gas of choice (e.g., a relatively safe gas) during the calibration process. Assuming sufficient microprocessor capabilities, the analyte concentration X and the effective pressure-broadening coefficient γ can be determined simultaneously in real time by a spectroscopy apparatus, using the pre determined values of the temperature-dependent constant $$\frac{\pi}{L \cdot S(T)}$$

and the intercept coefficient b determined during the calibration process. An advantage of this method is that the values of the temperature-dependent constant $$\frac{\pi}{L \cdot S(T)}$$

and the intercept coefficient b pre-determined during the calibration process using a relatively safe sample gas can be used in computing the analyte concentrations in any "real life" sample gas, thus requiring no prior knowledge of the sample gas composition. The calibration method can comprise the steps 310-350 as illustrated by the flowchart of FIG. 3.

At step 310, a first plurality of harmonic spectra (H) of known analyte concentrations (X) can be determined for a relatively safe sample gas, at a reference pressure $P_{ref}$ and a reference temperature $T_{ref}$.

At step 320, a slope coefficient $C(P_{ref}, T_{ref}, \gamma)$ for the sample gas corresponding to the reference pressure $P_{ref}$ and reference temperature $T_{ref}$ and the intercept coefficient b can be determined based on the first plurality of harmonic spectra (H) of known analyte concentrations (X) determined at step 310, e.g., by a linear fit of the data to equation (2). A skilled artisan would appreciate the fact that other methods of determining the slope coefficient and the intercept coefficient value based on the determined spectra are within the scope and the spirit of the invention. At this stage, the effective pressure-broadening coefficient ($\gamma$) can be left undetermined.

At step 330, the temperature-dependent constant $$\frac{\pi}{L \cdot S(T)},$$

and the effective pressure-broadening coefficient $\gamma$ of the sample gas, corresponding to a known temperature can be determined based on at least one harmonic spectrum (H) at the known temperature and a known pressure of the sample gas and the intercept coefficient b determined in step 320, following the procedure described with respect to step 240. In one embodiment, the sample gas in step 310 can differ from the sample gas in step 330. In the event that the sample gas in step 310 is the same as the sample gas in step 330, the harmonic spectrum used in step 330 can be selected from the plurality of harmonic spectra determined in step 310 and the known temperature can be the reference temperature $T_{ref}$.

At step 340, at least one harmonic spectrum of unknown concentration of analyte in a "real life" sample gas as well as the pressure and temperature of the "real life" sample gas are measured.

At step 350, these values can be fitted by a spectroscopy apparatus to equation (1) in real time to determine the analyte concentration X in and the effective pressure-broadening coefficient $\gamma$ of the "real life" sample gas, based on the pre-determined values of $$\frac{\pi}{L \cdot S(T)}$$

and b, and based on the harmonic spectrum, pressure, and temperature of the "real life" sample gas that are measured.

The steps 310-330 can be performed at the development and manufacturing stage of a spectroscopy apparatus. The steps 340-350 can be performed during the lifetime of the spectroscopy apparatus.

This embodiment involves only minimal engineering or manufacturing stage calibration yet enables accurate real-time determination of analyte concentration in a sample gas of unknown composition. The engineering or manufacturing stage calibration can use a sample gas of choice, which can be a relatively safe gas, and the calibration is not sample gas-specific. A wavelength-modulation spectroscopy apparatus produced according to this embodiment is able to respond effectively to any change in sample gas pressure, temperature and composition to ensure accurate determination of analyte concentration. This is especially valuable for process gas analysis where the gas composition is often variable.

Figure 3:
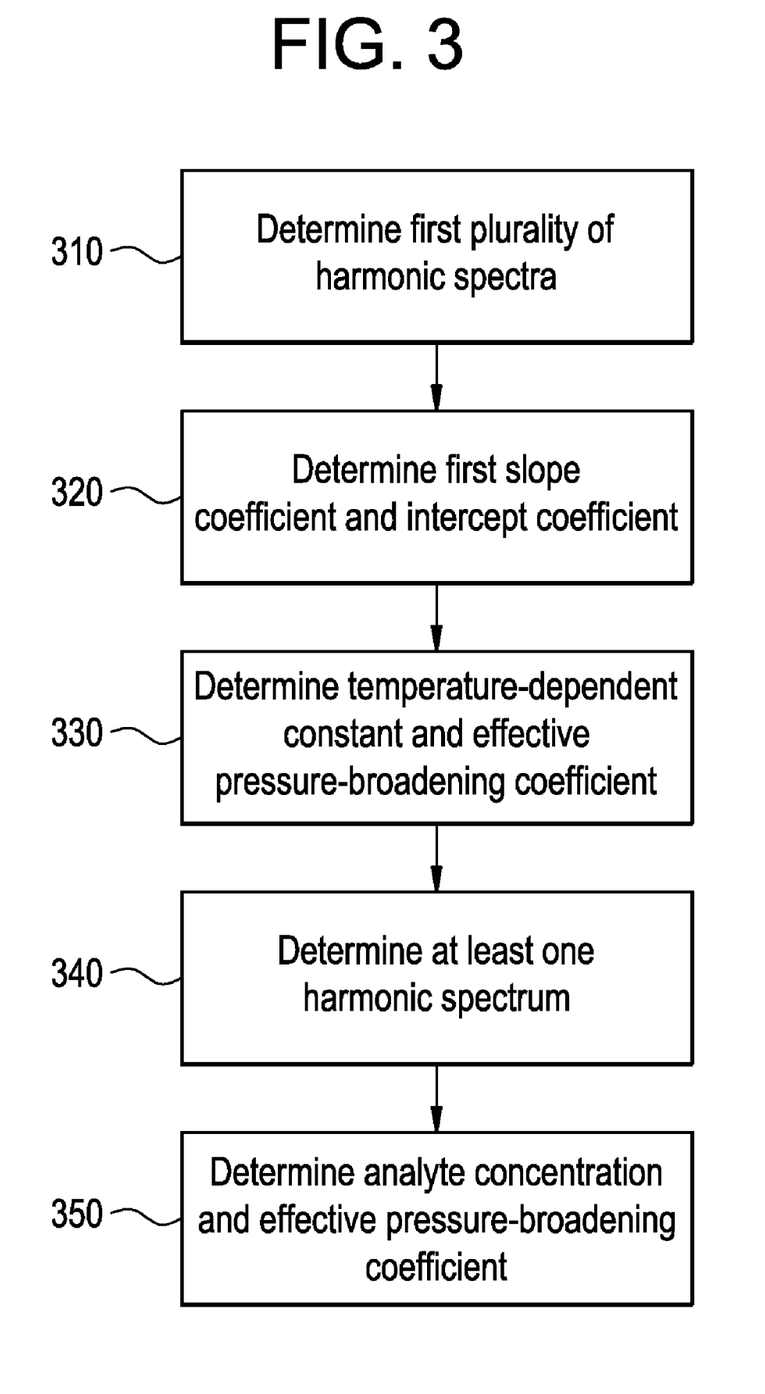
FIG. 3 illustrates a flowchart of another embodiment of the method of calibrating a wavelength-modulation spectroscopy apparatus.

In another embodiment, the calibration method illustrated in FIG. 3 can be employed for applications where the composition of a sample gas is constant. In those applications, an intermediate microprocessor can be used to determine the effective pressure-broadening coefficient $\gamma$ of the sample gas only once when a spectroscopy apparatus is employed to measure the sample gas for the first time. The analyte concentration X in the sample gas can be determined in real time by the spectroscopy apparatus using the once determined effective pressure-broadening coefficient $\gamma$, and the pre-determined values of the temperature-dependent constant $$\frac{\pi}{L \cdot S(T)}$$

and the intercept coefficient b determined during the calibration process.

This embodiment employs the same steps 310-350 discussed above, but only determines the effective pressure-broadening coefficient $\gamma$ of the "real life" sample gas once and determines the analyte concentration based, in part, on this effective pressure-broadening coefficient $\gamma$.

In operation, when a spectroscopy apparatus is employed to measure a certain gas for the first time, at least one harmonic spectrum, the pressure and the temperature of the sample gas are measured and can be fitted to equation (1) to determine the analyte concentration X and the effective pressure-broadening coefficient $\gamma$, based on the predetermined during the calibration process values of $$\frac{\pi}{L \cdot S(T)}$$

and b determined in steps 310-330. In the subsequent measurements of the same sample gas, the analyte concentration can be determined in step 350 in real time according to equation (2), based on at least one measured harmonic spectrum, the once determined effective pressure-broadening coefficient $\gamma$, and the pre-determined during the calibration process values of $$\frac{\pi}{L \cdot S(T)}$$

and b.

This embodiment involves only minimal engineering or manufacturing stage calibration with a sample gas of choice, which can be a relatively safe gas, while enabling accurate real-time determination of the analyte concentration in a sample gas of unknown yet constant composition.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. A skilled artisan would appreciate the fact that any variants of the calibration method and the embodiments still fall within the scope and the spirit of the invention.

The invention claimed is:

1. A method of calibrating a wavelength-modulation spectroscopy apparatus configured to measure a concentration of an analyte in a sample gas, said method comprising the steps of:
- determining a first slope coefficient corresponding to a reference pressure of a first sample gas and a reference temperature of said first sample gas, and determining an intercept coefficient reflecting contribution from the noise floor, said determinations based on a first plurality of harmonic spectra of known concentrations of said analyte at said reference pressure and said reference temperature of said first sample gas;
- determining a plurality of values of a temperature-dependent constant reflecting spectral line intensity and determining a plurality of values of an effective pressure-broadening coefficient at a plurality of values of temperature of said first sample gas, said determinations based on said intercept coefficient and a second plurality of harmonic spectra of one or more known concentrations of said analyte at said plurality of values of temperature of said first sample gas;
- determining a temperature-dependence exponent of said effective pressure-broadening coefficient for said first sample gas; and
- determining a plurality of values of a calibration function for said first sample gas, said determination based on said plurality of values of said temperature-dependent constant and a plurality of effective pressure-broadening coefficient values computed based on said temperature-dependence exponent.

2. The method of claim 1, further comprising the steps of:
- determining a second slope coefficient corresponding to said reference pressure and said reference temperature of said first sample gas, and determining a second intercept coefficient reflecting contribution from the noise floor, said determinations based on a third plurality of harmonic spectra of known concentrations of said analyte at said reference pressure and said reference temperature of said first sample gas;
- determining a scaling factor, said determination based on the ratio of said second slope coefficient and said first slope coefficient; and
- scaling said plurality of values of said calibration function for said first sample gas by said scaling factor.

3. The method of claim 1, wherein said method is performed for a second sample gas, wherein a plurality of values of a calibration function for said second sample gas are determined.

4. The method of claim 3, further comprising the steps of:
- determining a second slope coefficient corresponding to said reference pressure and said reference temperature of said first sample gas, and determining a second intercept coefficient reflecting contribution from the noise floor, said determinations based on a third plurality of harmonic spectra of known concentrations of said analyte at said reference pressure and said reference temperature of said first sample gas;
- determining a scaling factor, said determination based on the ratio of said second slope coefficient and said first slope coefficient; and
- scaling said plurality of values of said calibration function for said second sample gas by said scaling factor.

5. The method of claim 4, wherein said second sample gas is hazardous and said first sample gas is relatively safe.

6. The method of claim 1, wherein said method is performed during or before a manufacturing stage of said apparatus.

7. The method of claim 3, wherein said method is performed during or before a manufacturing stage of said apparatus.

8. The method of claim 2, wherein said method is performed during or after a manufacturing stage of said apparatus.

9. The method of claim 4, wherein said method is performed during or after a manufacturing stage of said apparatus.

* * * * *